(12) United States Patent
Yatabe et al.

(10) Patent No.: US 7,243,985 B2
(45) Date of Patent: Jul. 17, 2007

(54) VEHICLE STRUCTURE

(75) Inventors: Takayuki Yatabe, Kawasaki (JP); Keishi Goto, Okazaki (JP); Masashi Umeda, Okazaki (JP); Akitoshi Shii, Okazaki (JP)

(73) Assignee: Mitsubishi, Jidosha Engineering Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/231,892

(22) Filed: Sep. 22, 2005

(65) Prior Publication Data

US 2006/0066135 A1 Mar. 30, 2006

(30) Foreign Application Priority Data

Sep. 24, 2004 (JP) .............................. 2004-277865

(51) Int. Cl.
*B60J 7/00* (2006.01)
(52) U.S. Cl. ........................... 296/203.04; 296/203.03; 296/203.01
(58) Field of Classification Search ........... 296/203.04, 296/203.03, 203.01, 187.12, 210
See application file for complete search history.

(56) References Cited

U.S. PATENT DOCUMENTS

| | | | | |
|---|---|---|---|---|
| 4,036,522 A * | 7/1977 | DeRees et al. | ............. | 296/210 |
| 5,035,463 A * | 7/1991 | Kato et al. | ................... | 296/223 |
| 5,092,649 A * | 3/1992 | Wurl | .......................... | 296/103 |
| 5,325,585 A * | 7/1994 | Sasaki et al. | ............... | 29/897.2 |
| 5,352,011 A * | 10/1994 | Kihara et al. | .......... | 296/203.03 |
| 5,681,076 A * | 10/1997 | Yoshii | ........................ | 296/210 |
| 5,795,014 A * | 8/1998 | Balgaard | .................... | 296/210 |
| 5,934,745 A * | 8/1999 | Moore et al. | .......... | 296/193.04 |
| 6,010,182 A * | 1/2000 | Townsend | .............. | 296/203.01 |
| 6,073,993 A * | 6/2000 | Iwatsuki et al. | ....... | 296/203.04 |
| 6,092,865 A * | 7/2000 | Jaekel et al. | ................ | 296/205 |
| 6,102,472 A * | 8/2000 | Wallstrom | ............. | 296/203.01 |
| 6,139,094 A * | 10/2000 | Teply et al. | ........... | 296/203.03 |
| 6,206,458 B1 * | 3/2001 | Schroeder et al. | ..... | 296/203.01 |
| 6,282,790 B1 * | 9/2001 | Jaekel et al. | ................ | 29/897.2 |
| 6,302,478 B1 * | 10/2001 | Jaekel et al. | ................ | 296/205 |
| 6,325,450 B2 * | 12/2001 | Sakyo et al. | ........... | 296/190.08 |
| 6,474,726 B1 * | 11/2002 | Hanakawa et al. | ........ | 296/191 |
| 6,530,621 B1 * | 3/2003 | Williams et al. | ....... | 296/216.04 |
| 6,623,067 B2 * | 9/2003 | Gabbianelli et al. | ........ | 296/205 |
| 6,655,729 B2 * | 12/2003 | Neale | .................... | 296/193.07 |
| 6,854,795 B2 * | 2/2005 | Yamazaki et al. | .......... | 296/209 |
| 6,926,350 B2 * | 8/2005 | Gabbianelli et al. | ... | 296/203.01 |

(Continued)

FOREIGN PATENT DOCUMENTS

JP 2543203 B2 7/1996

*Primary Examiner*—Kiran B. Patel
(74) *Attorney, Agent, or Firm*—Birch, Stewart, Kolasch & Birch, LLP

(57) ABSTRACT

A vehicle structure, preferably applied to a vehicle with 2-door automobiles with the intention of inhabitation of center pillar deformation, particularly intrusion inside the vehicle, as a side impact collision, including: a rear roof rail which is placed in a reward position of a center pillar and which forms a rear end of a roof of a vehicle; and a connector which connects a closed section formed on the center pillar and a closed section formed on the rear roof rail so that the first and the second closed sections are formed into a continuous closed section and which includes a side roof rail part which forms a portion of a side roof rail that extend in the longitudinal direction of the vehicle.

8 Claims, 2 Drawing Sheets

U.S. PATENT DOCUMENTS 6,957,845 B2 * 10/2005 Rager ................. 296/146.9
6,983,981 B2 * 1/2006 Saeki ................. 296/187.12
7,032,958 B2 * 4/2006 White et al. .......... 296/193.01
2002/0050064 A1 * 5/2002 Furuse et al. ........... 29/897.2
2003/0141747 A1 * 7/2003 Honma et al. ......... 296/203.03
2004/0245033 A1 * 12/2004 Saeki ..................... 180/89.1
2005/0189790 A1 * 9/2005 Chernoff et al. ....... 296/193.05

* cited by examiner

ENLARGED A_PART

VEHICLE STRUCTURE

BACKGROUND OF THE INVENTION

1. Field of the Invention

The present invention relates to a vehicle structure preferably applied to a vehicle with 2-door automobiles.

2. Description of the Related Art

Generally, a vehicle has side roof rails extending in the longitudinal direction of the vehicle on the upper positions of both sides and center pillars extending in the vertical direction behind door apertures. The upper end of a center pillar is coupled to a corresponding side roof rail, and the lower end thereof is coupled to a side sill.

There is provided a rear roof rail at the rear end of a roof of the vehicle, and each end of the rear roof rail are coupled to one of the side roof rails. These parts arranged as mentioned above, form an upper structure of the vehicle.

Japanese Patent Publication No. 2543203 proposes a technique concerning a vehicle structure which an end of a rear roof rail is coupled to a connection between a rear pillar inner and a reinforcement of a center pillar.

However, in spite of efforts made by various conventional techniques, it has been difficult to ensure adequate strength to inhibit a deformation of the center pillar, particularly intrusion inside the vehicle, upon a side impact collision. In other words, such a conventional technique has a possibility of separation of the center pillar from a connection with the side roof rail and resultant intrusion of the center pillar inside the vehicle if a large force is laterally applied to the vehicle.

Additionally, the technique disclosed in the above patent Publication can improve the strength of each connection of parts but can be used only when a center pillar and a rear roof rail are at the same position in the longitudinal direction of the vehicle. Therefore, the technique can be applied on vehicles of limited types. Further, the technique merely strengthens the connection between the center pillar and the rear roof rail and problematically, cannot acceptably prevent the center pillar to deform when a side impact collision.

With the foregoing problems in view, the object of the present invention is to provide a vehicle structure with a center pillars whose strength is greatly increased so that the center pillar is not deformed and particularly does not intrude inside the vehicle upon a side impact collision.

SUMMARY OF THE INVENTION

To attain the above object, as a generic feature, there is provided a vehicle structure comprising: a rear roof rail which is placed in a reward position of a center pillar and which forms a rear end of a roof of a vehicle; and a connector which connects a closed section formed on the center pillar and a closed section formed on the rear roof rail so that the first and the second closed sections are formed into a continuous closed section and which includes a side roof rail part which forms a portion of a side roof rail that extend in the longitudinal direction of the vehicle.

Consequently, the vehicle structure of the present invention can form the center pillar and the rear roof rail as a unit simply by connecting a closed section formed on the center pillar and a closed section formed on the rear roof rail to form a continuous closed section. Thereby, the strength and the stiffness of the center pillar can be greatly enhanced without an increase in cost and a large variation in structure whereupon deformation and intrusion of the center pillar when a side impact collision are surely inhibited. Advantageously, the vehicle structure can provide the vehicle with greatly improved safety.

Other objects and further features of the present invention will be apparent from the following detailed description when read in conjunction with the accompanying drawings.

DETAILED DESCRIPTION OF THE INVENTION

Figure 1:
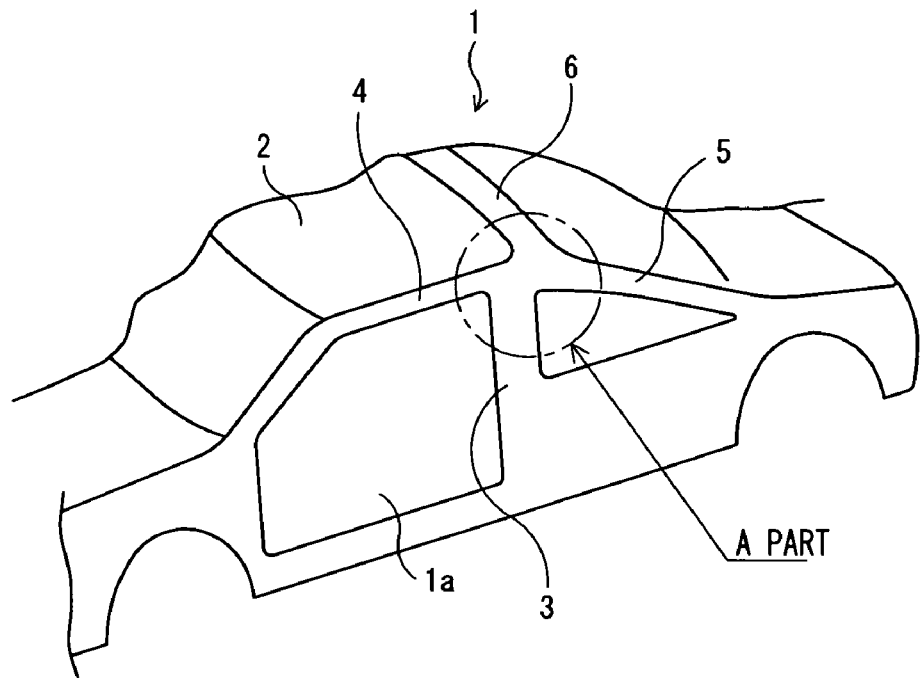
FIG. 1 is a diagram illustrating a vehicle part to which a vehicle structure according to an embodiment of the present invention is applied.
Figure 2:
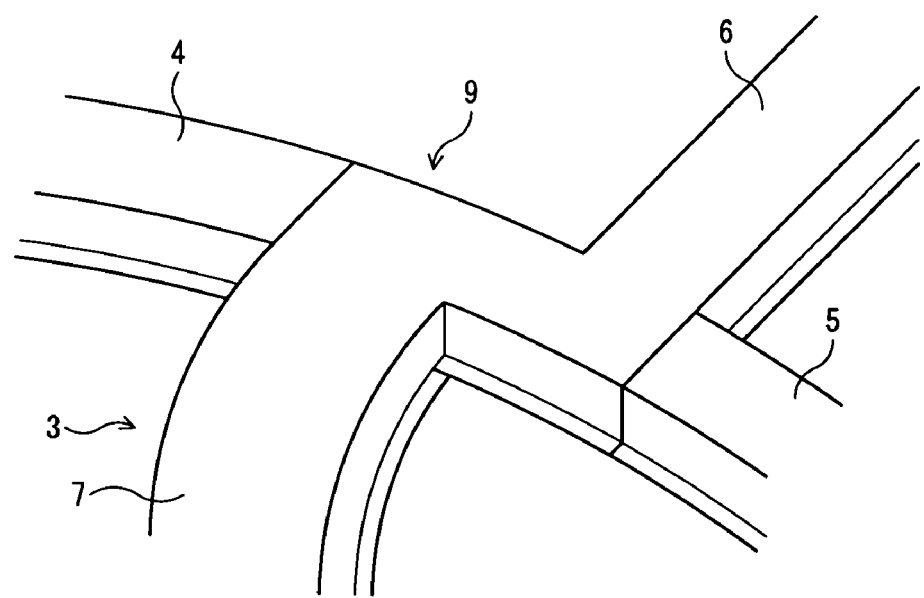
FIG. 2 is a diagram schematically illustrating the main part of the vehicle structure of the embodiment and enlarging A part of FIG. 1.

An embodiment of the present invention will now be described with reference to the accompanying drawings. In FIG. 1, symbol 1 represents a vehicle with a two-door bodywork, and a center pillar (B pillar) 3 extends in a vertical direction behind a door aperture 1a of the vehicle 1. As shown in FIGS. 1 and 2, a side roof rail 4 extending in a longitudinal direction of the vehicle 1 is placed above the center pillar 3. The rear end of the side roof rail 4 is coupled to a rear pillar 5.

A rear roof rail 6 that forms the rear end of a roof 2 of the vehicle 1 is arranged in a lateral direction of the vehicle 1. Both ends of the rear roof rail 6 are connected to the side roof rails 4 arranged on both sides.

Figure 3:
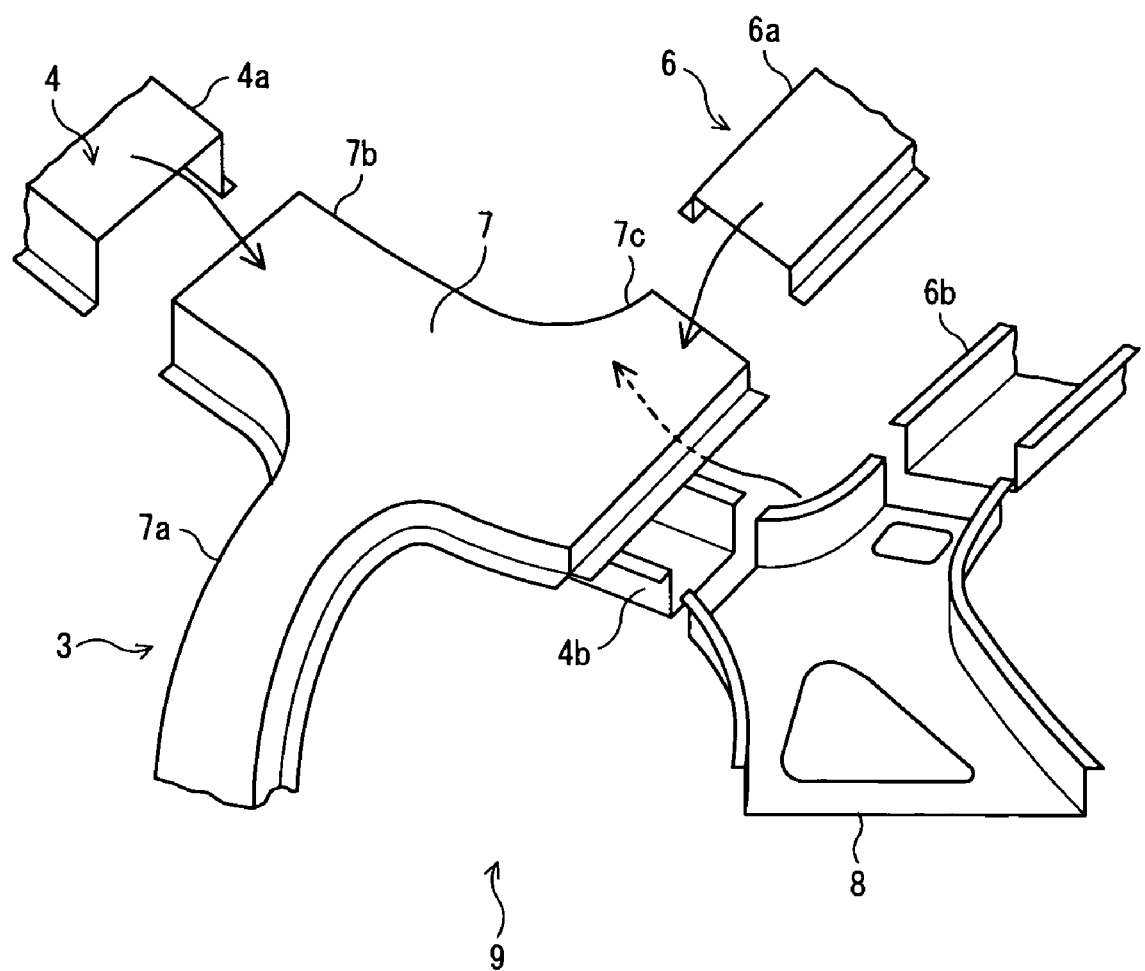
FIG. 3 is an exploded perspective view schematically showing the main part of the vehicle structure of FIG. 2.

Further, a reinforcement (a connector outer) 7 shown in FIG. 3 is arranged in the proximity of connections formed by the center pillar 3, the rear roof rail 6 and the side roof rail 4.

The reinforcement 7 includes a center pillar reinforcement (center pillar part) 7a placed inside the center pillar 3 and serving as a reinforcement for the center pillar 3; a side roof rail reinforcement (side roof rail part) 7b connected to one end of the side roof rail 4 and forming a portion of the side roof rail 4; and a rear roof rail reinforcement (rear roof rail part) 7c connected to one end of the rear roof rail 6 and forming a portion of the rear roof rail 6. The center pillar reinforcement 7a, the side roof rail reinforcement 7b and the rear roof rail reinforcement 7c are formed as a unit.

The center pillar reinforcement 7a extends downwards so as to reach a non-illustrated side sill. A center pillar outer and a center pillar inner (both not shown) are disposed so that the center pillar reinforcement 7a is sandwiched between the center pillar outer and inner whereupon a center pillar 3 with a closed section is formed.

A quarter panel inner 8 is arranged facing the reinforcement 7. Welding the flanges of the quarter panel inner 8 and the reinforcement 7 together forms a closed-sectional structure (connector) 9.

The side roof rail 4 includes a side roof rail outer 4a arranged outside of the vehicle 1 and a side roof rail inner 4b arranged inside of the vehicle 1 and opposing the side roof rail outer 4a. Welding the side roof rail outer 4a and the side roof rail inner 4b together forms the side roof rail 4 of closed section.

The rear end of the side roof rail outer 4a is coupled to the reinforcement 7 so as to overlap the side roof rail reinforcement 7b, and the rear end of the side roof rail inner 4b is coupled to the quarter panel inner 8 so as to overlap the quarter panel inner 8.

At the connection between the side roof rail reinforcement 7b and the side roof rail 4, there is provided a bulkhead, which serves as a partition that separate the closed section at the connection between the side roof rail reinforcement 7b and the side roof rail 4 into two parts and which is not shown in accompanying drawing. The bulk head is formed by, for example, bending ends of the side roof rail reinforcement 7b and the side roof rail 4 with the intention of improvement in strength and in stiffness between the reinforcement 7 and the side roof rail 4.

On the other hand, the rear roof rail 6 is, as shown in FIG. 3, formed by a rear roof rail outer 6a arranged outside the vehicle 1 and a rear roof rail inner 6b arranged inside the vehicle 1 and opposing the rear roof rail outer 6a. Welding the rear roof rail outer 6a and the rear roof rail inner 6b together forms a rear roof rail 6 having a closed section.

Each of the both ends of the rear roof rail outer 6a (only the left end appears in FIG. 3) is coupled to the reinforcement 7 so as to overlap the a rear roof rail reinforcement 7c, and each of the both ends of the rear roof rail inner 6b is coupled to the quarter panel inner 8 so as to overlap the quarter panel inner 8.

With this structure, the connector 9 formed by the reinforcement 7 and the quarter panel inner 8 forms the closed section on the center pillar 3 and that on the rear roof rail 6 into a continuous closed section.

Namely, in this embodiment, the reinforcement 7 for the center pillar 3 and the rear roof rail 6 are formed as a unit with a closed section by the connector 9, as shown in FIG. 2.

The side roof rail 4 is smoothly coupled to the rear pillar 5 shown in FIG. 2 via the reinforcement 7, although not shown in FIG. 3.

Since a vehicle structure according to this embodiment of the present invention has the composition as mentioned above, the present invention carries the following advantages.

Forming the center pillar reinforcement 7a and the reinforcement 7 as a unit inhibits a deformation of the center pillar even when a large force is input from the side of the vehicle upon a side impact collision or the like whereupon the present invention can surely avoid the conventional problem that the center pillar 3 separates from the connection with the side roof rail 4 and intrudes inside the vehicle.

Particularly, since the closed sections formed on the center pillar 3 and on the rear roof rail 6 are formed into a continuous closed section by the connector 9, the center pillar 3 and the rear roof rail 4 can be formed as a unit, which can provide the upper part of the center pillar 3 with adequate strength.

Connecting the side roof rail part 7b of the connector 9 with the side roof rail 4 and connecting the rear roof rail part 7c of the connector 9 with the rear roof rail 6 can ensure that a force laterally input is dispersed from the center pillar 3 to the side roof rail 4 and to the rear roof rail 6.

Advantageously, forming the bulkhead at the connection between the connector 9 and the side roof rail 4 can further improve strength and stiffness of the connection between the side roof rail 4 and the connector 9. Additionally, forming the reinforcement 7 and the center pillar reinforcement 7a can further improve strength of the center pillar 3.

The center pillar outer and inner, not shown in the drawings, can be the same as those used for a conventional vehicle, the vehicle structure of the present invention does not absolutely harm the shape and the design of the vehicle. Apparent connection states among the center pillar 3, the side roof rail 4 and the rear roof rail 6 can be the same as that for a conventional vehicle, and therefore the shape and the design of the vehicle are not totally harmed also from this point.

Advantageously, the simple structure of the present invention does not require a large variation in structure of a conventional vehicle, and further does not increase a cost and a weight of the vehicle. Further, since the structures of the center pillar and the side roof rail should by no means be limited, the present invention can be applied to various vehicle types.

An embodiment of the present invention has been described as above, but should by no means be limited to the foregoing embodiments. Various changes and modifications can be suggested without departing the sprit of the present invention.

For example, the description has been made assuming that the present invention is applied to a vehicle with two-door automobiles. Alternatively, the present invention may be applied to a vehicle with three-door automobiles or to a vehicle of another type.

What is claimed is:

1. A vehicle structure, comprising:
    a rear roof rail placed in a reward position of a center pillar and which forms a rear end of a roof of a vehicle; and
    a connector which connects a first closed section formed on the center pillar and a second closed section formed on said rear roof rail, such that the first and the second closed sections are formed into a continuous closed section and which includes a side roof rail part which forms a portion of a side roof rail that extend in the longitudinal direction of the vehicle,
    wherein, said side roof rail is connected to said rear roof rail via said connector.

2. A vehicle structure according to claim 1, wherein said connector and the side roof rail form a bullhead at a connection between said side roof rail part of said connector and the side roof rail.

3. A vehicle structure according to claim 1, wherein said connector and a reinforcement of the center pillar are formed as a unit.

4. A vehicle structure according to claim 1, wherein said connector forms a portion of said rear roof rail part.

5. A vehicle structure according to claim 1, wherein:
    said connector and a reinforcement of the center pillar are formed as a unit; and
    said connector forms a portion of said rear roof rail part.

6. A vehicle structure according to claim 1, wherein:
    said connector includes a center pillar reinforcement that extends downward towards a side sill of the vehicle and reaches said side sill.

7. A vehicle structure according to claim 6, wherein:
    said center pillar includes a center pillar outer and a center pillar inner,
    wherein, said center pillar reinforcement is sandwiched between said center pillar outer and the center pillar inner.

8. A vehicle structure according to claim 1, further comprising:
    a side roof rail inner coupled to the side roof rail and said connector to form a closed cross section with the side roof rail inner and said connector.

* * * * *